(12) United States Patent  
Oh

(10) Patent No.: US 9,562,924 B2  
(45) Date of Patent: Feb. 7, 2017

(54) VEHICLE SPEED DETECTING SYSTEM AND VEHICLE SPEED DETECTING METHOD USING THE SAME

(71) Applicant: Hyundai Motor Company, Seoul (KR)

(72) Inventor: Semin Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 608 days.

(21) Appl. No.: 14/138,924

(22) Filed: Dec. 23, 2013

(65) Prior Publication Data

US 2014/0182374 A1 Jul. 3, 2014

(30) Foreign Application Priority Data

Dec. 28, 2012 (KR) .................. 10-2012-0157487

(51) Int. Cl.
*G01P 1/02* (2006.01)
*G01P 3/487* (2006.01)
*G01P 3/02* (2006.01)

(52) U.S. Cl.
CPC ........... *G01P 3/487* (2013.01); *G01P 3/02* (2013.01)

(58) Field of Classification Search
CPC ........................................................ G01P 3/02
See application file for complete search history.

(56) References Cited

U.S. PATENT DOCUMENTS

| 4,894,613 A * | 1/1990 | Tsugawa ............... G01P 3/489 324/166 |
| 5,101,155 A * | 3/1992 | Oehler ................... G01P 21/02 324/160 |
| 5,451,867 A | 9/1995 | Loreck et al. |
| 5,812,429 A * | 9/1998 | Downey ............... H03K 5/1252 324/166 |
| 6,133,728 A * | 10/2000 | Manlove ................ G01P 3/481 324/166 |

(Continued)

FOREIGN PATENT DOCUMENTS

| JP | 10-132834 | 5/1998 | |
| JP | 2003245830 A * | 9/2003 | ............... G01P 21/02 |

(Continued)

*Primary Examiner* — Harshad R Patel
*Assistant Examiner* — Samir M Shah
(74) *Attorney, Agent, or Firm* — Mintz Levin Cohn Ferris Glovsky and Popeo, P.C.; Peter F. Corless

(57) ABSTRACT

A system for detecting a vehicle speed, includes: a pulse ring including a pulse ring rotation part rotating according to travel of a vehicle, and a plurality of pitch units provided in the pulse ring rotation part at a predetermined interval; a vehicle speed sensor adjacently provided to the pulse ring and configured to output a voltage signal generated according to a distance between the vehicle speed sensor and a pitch unit; an output unit configured to output a voltage pulse signal and a voltage pulse amplitude change signal of the vehicle speed sensor; a first vehicle speed detection unit configured to detect the vehicle speed based on the voltage pulse signal of the output unit; and a second vehicle speed detection unit configured to detect the vehicle speed based on the voltage pulse amplitude change signal of the output unit, in which at least one of the plurality of pitch units has an adjacent distance which is different from an adjacent distance between another of the pitch units and the vehicle speed sensor.

8 Claims, 10 Drawing Sheets

(a)

(b)

(56) References Cited

U.S. PATENT DOCUMENTS

| | | | | |
|---|---|---|---|---|
| 6,215,297 | B1 * | 4/2001 | Bleckmann | G01B 7/14 324/166 |
| 6,445,176 | B1 * | 9/2002 | Wallrafen | G01D 5/145 123/406.6 |
| 6,998,813 | B2 * | 2/2006 | Heizmann | G01P 3/4802 318/400.38 |
| 7,031,874 | B2 * | 4/2006 | Tsuruhara | B60T 8/171 702/148 |
| 7,680,579 | B2 * | 3/2010 | Kawasaki | G01P 3/49 123/350 |
| 8,018,223 | B2 * | 9/2011 | Latoria | G01D 5/145 324/207.25 |
| 8,146,858 | B2 * | 4/2012 | Port-Robach | B64C 13/28 188/71.2 |
| 8,970,209 | B2 * | 3/2015 | Pigott | G01D 5/2013 324/207.25 |
| 9,103,847 | B2 * | 8/2015 | Pigott | G01P 3/488 |
| 9,395,391 | B2 * | 7/2016 | Fernandez | G01R 1/44 |
| 2009/0315534 | A1 * | 12/2009 | Hawkins | G01R 21/02 324/104 |

FOREIGN PATENT DOCUMENTS

| | | | | |
|---|---|---|---|---|
| JP | 2008082755 A | * | 4/2008 | G01P 21/02 |
| KR | 0150095 | | 6/1998 | |

* cited by examiner

FIG.1
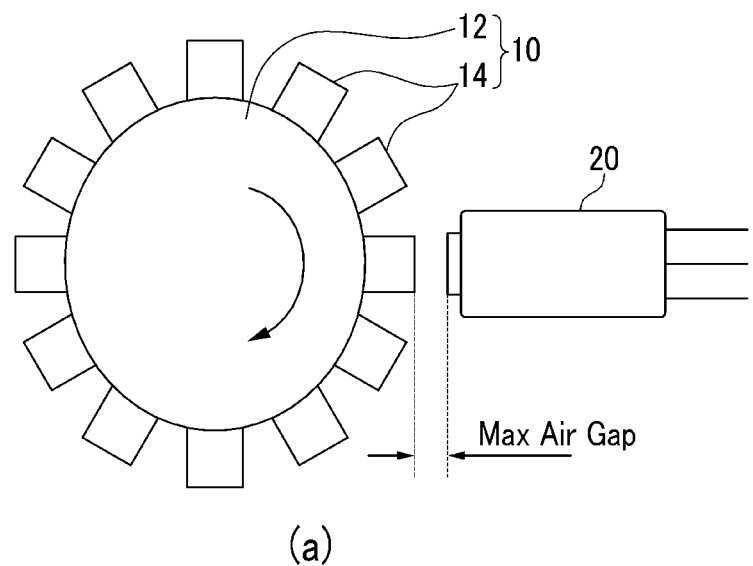
(a)
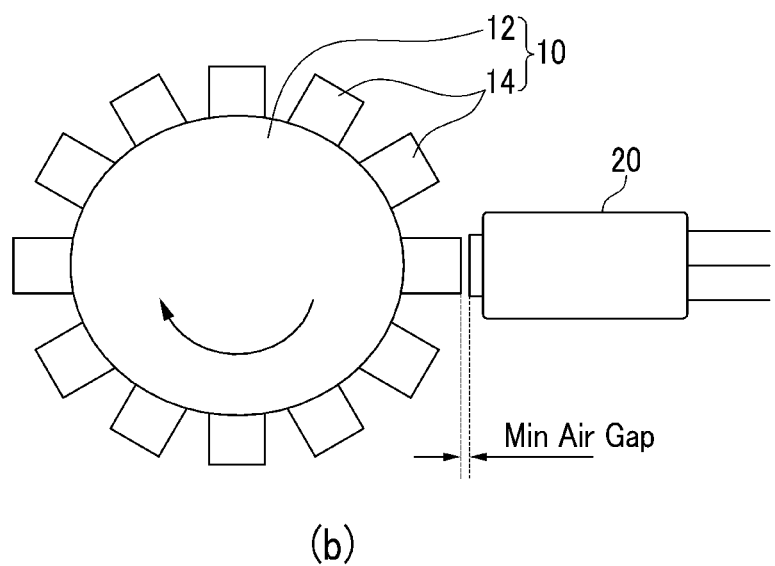
(b)

FIG.3
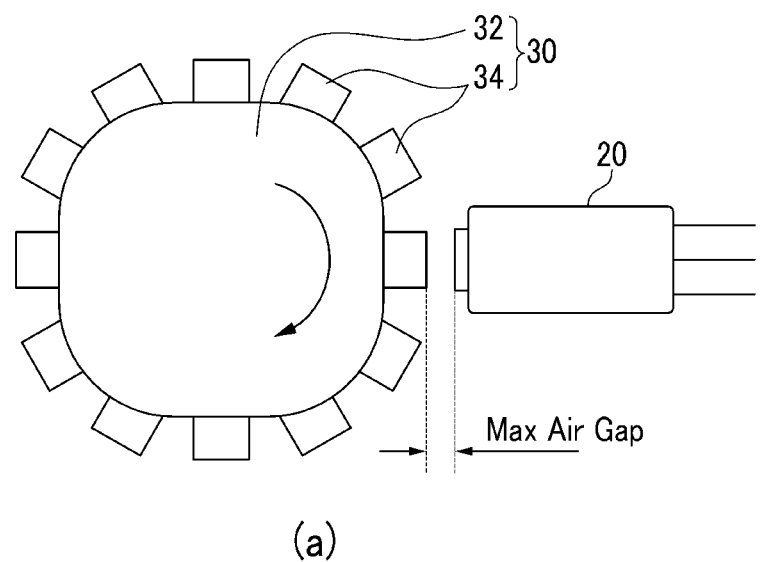
(a)
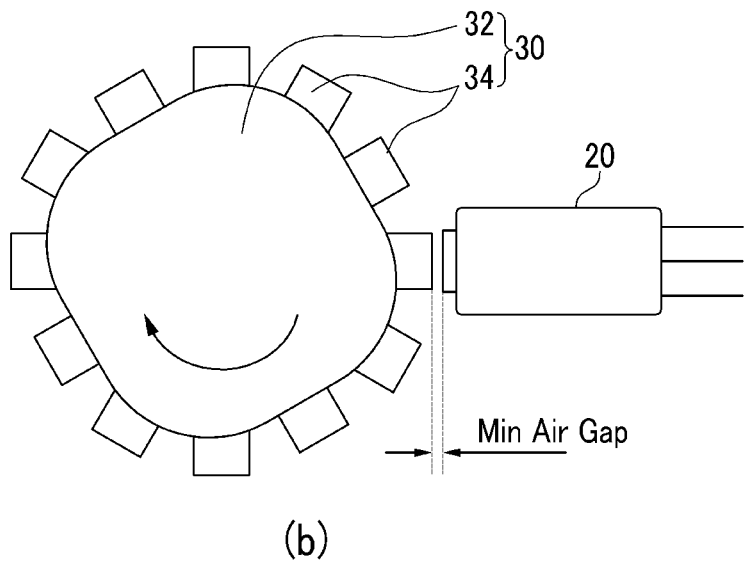
(b)

FIG.8 (RELATED ART)
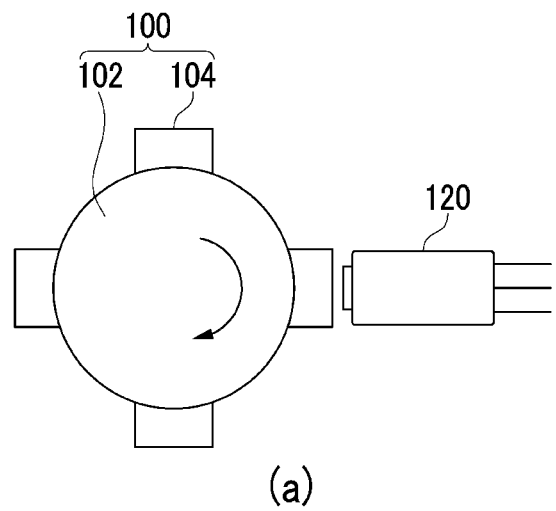
(a)
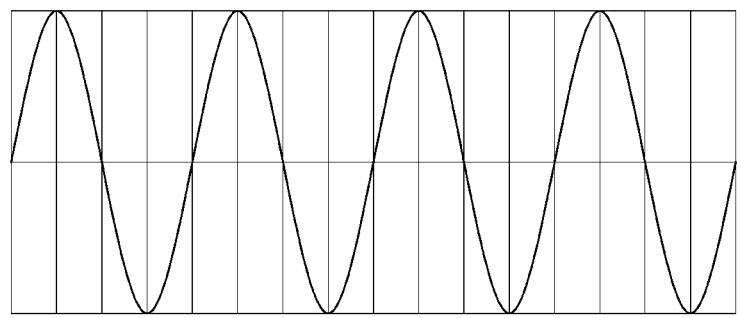
(b)
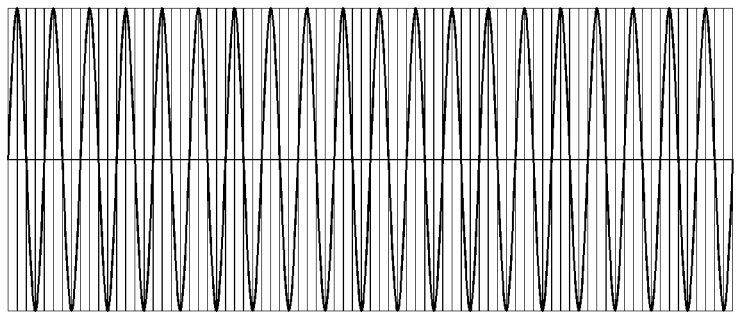
(c)

FIG.9 (RELATED ART)
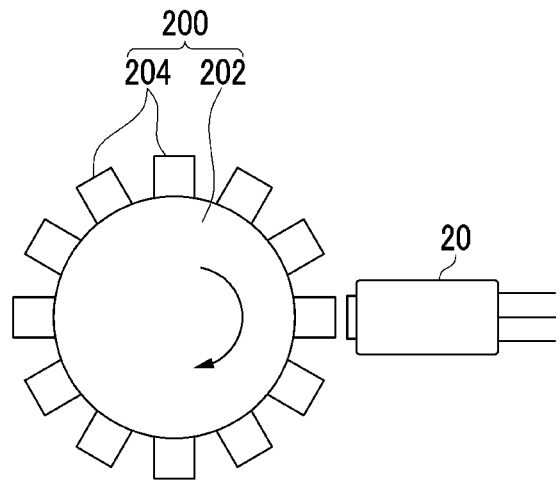
(a)
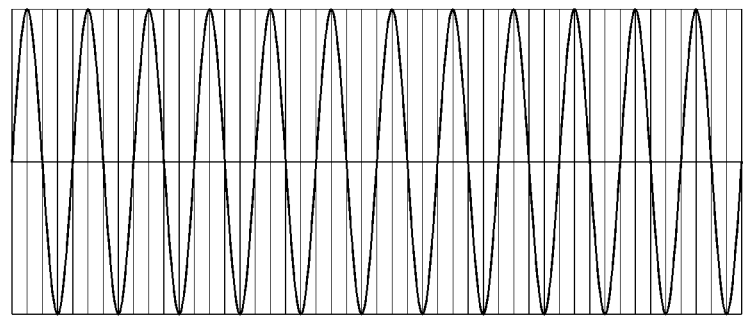
(b)
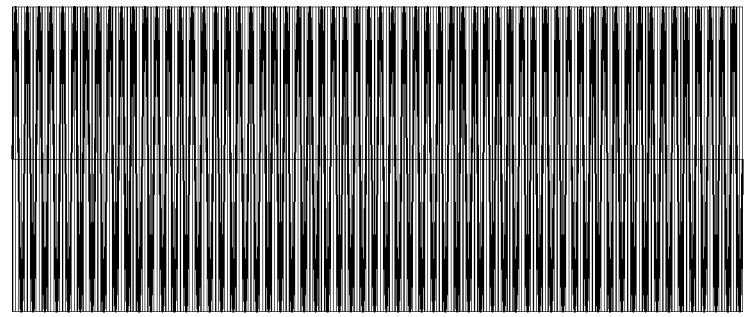
(c)

VEHICLE SPEED DETECTING SYSTEM AND VEHICLE SPEED DETECTING METHOD USING THE SAME

CROSS-REFERENCE TO RELATED APPLICATION

This application claims under 35 U.S.C. §119(a) priority to and the benefit of Korean Patent Application No. 10-2012-0157487 filed in the Korean Intellectual Property Office on Dec. 28, 2012, the entire contents of which are incorporated herein by reference.

BACKGROUND (a) Field of the Invention

The present invention relates to a vehicle speed detecting system, and a vehicle speed detecting method using the same, and more particularly, to a vehicle speed detecting system capable of accurately detecting a speed of a vehicle at a low speed and a high speed, and a vehicle speed detecting method using the same.

(b) Description of the Related Art

In a method of sensing a speed of a vehicle, a pulse ring is installed at an output side of a transmission, and a sensor is adjacently installed to the pulse ring, where the sensor senses a rotation speed by sensing a change in amplitude of a voltage generated by a hall effect.

A wheel speed sensor installed in each wheel for an ABS or a VDC senses a speed by the same principle. In particular, a change in a magnetic field due to a rotation of the pulse ring generates a voltage in a sensor coil, and the fine voltage drives a transistor again to transmit rotation information on the sensor to a processor. A size of the voltage generated at this time is determined by a distance between the sensor and a conductor.

FIGS. 8 and 9 (RELATED ART) are drawings illustrating a conventional vehicle speed detecting system and output waveforms thereof.

FIG. 8 (RELATED ART) illustrates a configuration in which a pulse ring rotation part 102 of a pulse ring 100 is provided with four conductors (pitch units) 104 (FIG. 8(*a*)), and output waveform graphs of the pulse ring at a low speed (FIG. 8(*b*)) and a high speed (FIG. 8(*c*)) according to the configuration, and a sensor 120 is adjacently provided to the pulse ring 100.

FIG. 9 (RELATED ART) illustrates a configuration in which a pulse ring rotation part 202 of a pulse ring 200 is provided with 12 conductors (pitch units) 204 (FIG. 9(*a*)), and output waveform graphs of the pulse ring at a low speed (FIG. 9(*b*)) and a high speed (FIG. 9(*c*)) according to the configuration, and a sensor 220 is adjacently provided to the pulse ring 200.

In a case where the four conductors (pitch units) 104 are provided, the appropriate number of output waveforms for detecting a vehicle speed is detected at the high speed as illustrated in FIG. 8(*c*), so that it is possible to accurately calculate the speed, but the number of output waveforms detected at the low speed is small as illustrated in FIG. 8(*b*), so that it is difficult to accurately calculate the speed.

In a case where the 12 conductors (pitch units) 204 are provided, the appropriate number of output waveforms for detecting a vehicle speed is detected at the low speed as illustrated in FIG. 9(*b*), so that it is possible to accurately calculate the speed, but the number of output waveforms detected at the high speed is excessive as illustrated in FIG. 9(*c*), so that a processor having excellent calculation performance is required in order to accurately calculate the speed.

The above information disclosed in this Background section is only for enhancement of understanding of the background of the invention and therefore it may contain information that does not form the prior art that is already known in this country to a person of ordinary skill in the art.

SUMMARY

The present invention provides a vehicle speed detecting system capable of accurately detecting a speed of a vehicle at a low speed and a high speed, and a vehicle speed detecting method using the same. An exemplary embodiment of the present invention provides a system for detecting a vehicle speed, including: a pulse ring including a pulse ring rotation part rotating according to travel of a vehicle, and a plurality of pitch units provided in the pulse ring rotation part at a predetermined interval; a vehicle speed sensor adjacently provided to the pulse ring and configured to output a voltage signal generated according to a distance between the vehicle speed sensor and a pitch unit (of the plurality of pitch units); an output unit configured to output a voltage pulse signal and a voltage pulse amplitude change signal of the vehicle speed sensor; a first vehicle speed detection unit configured to detect the vehicle speed based on the voltage pulse signal of the output unit; and a second vehicle speed detection unit configured to detect the vehicle speed based on the voltage pulse amplitude change signal of the output unit, in which at least one of the plurality of pitch units has an adjacent distance which is different from an adjacent distance between another pitch unit and the vehicle speed sensor.

The pulse ring rotation part may not be shaped like a complete circle.

The pulse ring rotation part may be formed in an ellipsoidal shape.

The pulse ring rotation part may be formed in a polygonal shape with rounded corners.

The pulse ring rotation part may be formed in a square shape with rounded corners.

The pulse ring rotation part may be formed in a shape of a complete circle, and an installation height of at least one of the pitch units among the plurality of pitch units for the pulse ring rotation unit is different from an installation height of another of the pitch units for the pulse ring rotation part. The output unit may include a low pass filter. The output unit may include a high pass filter.

Another exemplary embodiment of the present invention a method of detecting a vehicle speed by the system for detecting the vehicle speed, the method including: outputting a signal of the first vehicle speed detection unit as a vehicle speed; determining whether the signal of the first vehicle speed detection unit is larger than a predetermined first vehicle speed; when the signal of the first vehicle speed detection unit is larger than the predetermined first vehicle speed, outputting a signal of the second vehicle speed detection unit as the vehicle speed; determining whether the current vehicle speed is smaller than a predetermined second vehicle speed; and when the current vehicle speed is smaller than the predetermined second vehicle speed, outputting the signal of the first vehicle speed detection unit as a vehicle speed.

The predetermined first vehicle speed may be larger than the predetermined second vehicle speed.

According to the vehicle speed detection system and the vehicle speed detection method according to the exemplary embodiments of the present invention, it is possible to accurately detect a speed of a vehicle at a low speed and a high speed.

BRIEF DESCRIPTION OF THE DRAWINGS

FIG. 1 is a schematic diagram illustrating a first pulse ring applied to a vehicle speed detecting system according to an exemplary embodiment of the present invention.

FIG. 3 is a schematic diagram illustrating a second pulse ring applied to the vehicle speed detecting system according to the exemplary embodiment of the present invention.

FIGS. 8 and 9 (RELATED ART) are drawings illustrating a conventional vehicle speed detecting system and output waveforms thereof.

DETAILED DESCRIPTION OF THE EMBODIMENTS

Figure 2:
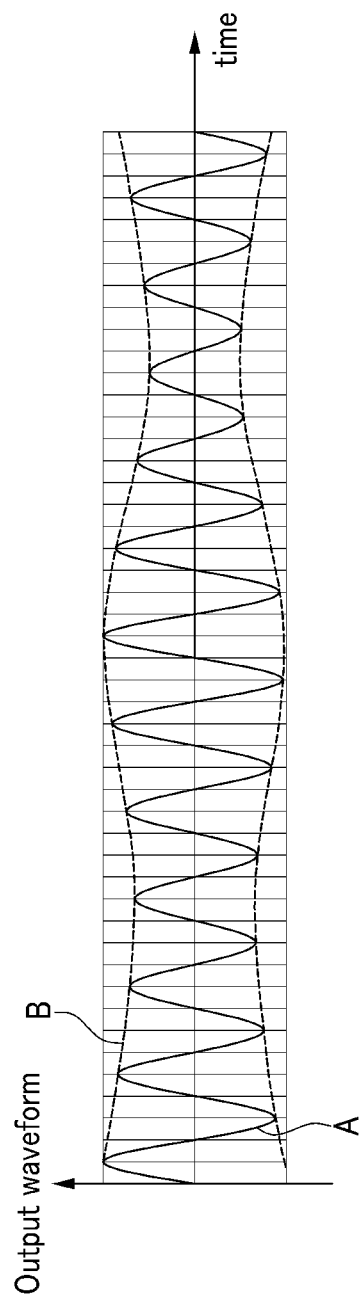
FIG. 2 is a graph illustrating an output waveform by the first pulse ring applied to the vehicle speed detecting system of FIG. 1.

In the following detailed description, only certain exemplary embodiments of the present invention have been shown and described, simply by way of illustration.

As those skilled in the art would realize, the described embodiments may be modified in various different ways, all without departing from the spirit or scope of the present invention Throughout the specification, like reference numerals designate like elements throughout the specification.

In the drawings, the thickness of layers, films, panels, regions, etc., are exaggerated for clarity.

Throughout the specification, unless explicitly described to the contrary, the word "comprise" and variations such as "comprises" or "comprising" will be understood to imply the inclusion of stated elements but not the exclusion of any other elements.

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 7:
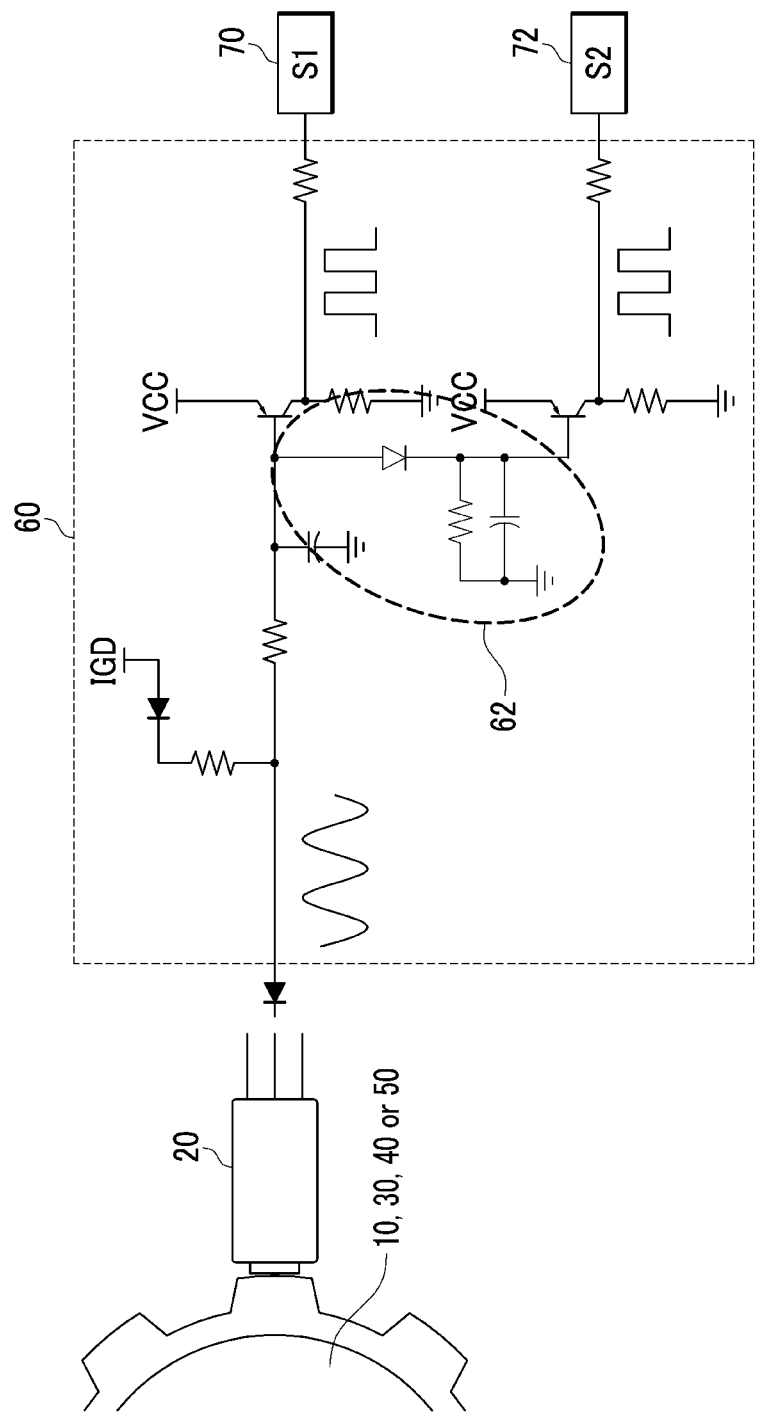
FIG. 7 is a schematic diagram illustrating the vehicle speed detecting system according to the exemplary embodiment of the present invention.

FIG. 7 is a schematic diagram illustrating a vehicle speed detecting system according to an exemplary embodiment of the present invention.

Referring to FIG. 7, the vehicle speed detecting system according to the exemplary embodiment of the present invention includes pulse rings 10, 30, 40, and 50 including a pulse ring rotation part rotating according to travel of a vehicle and a plurality of pitch units provided in the pulse ring rotation part at a predetermined interval, a vehicle speed sensor 20 adjacently provided to the pulse rings 10, 30, 40, and 50 to output a voltage signal generated according to a distance from each pitch unit, an output unit 60 for outputting a voltage pulse signal and a voltage pulse amplitude change signal of the vehicle speed sensor 20, a first vehicle speed detection unit S1 for detecting a vehicle speed based on a voltage pulse signal of the output unit 60, and a second vehicle speed detection unit S2 for detecting a vehicle speed based on a voltage pulse amplitude change signal of the output unit 60, and at least a part of the plurality of pitch units may have an adjacent distance which is different from an adjacent distance between another pitch unit and the vehicle speed sensor 20.

FIG. 1 is a schematic diagram illustrating a first pulse ring applied to a vehicle speed detecting system according to the exemplary embodiment of the present invention, and FIG. 2 is a graph illustrating an output waveform by the first pulse ring applied to the vehicle speed detecting system according to the exemplary embodiment of the present invention.

Referring to FIG. 1, the first pulse ring applied to the vehicle speed detecting system according to the exemplary embodiment of the present invention includes a pulse ring rotation part 12 which preferably is not shaped like a complete circle, and a plurality of pitch units 14 provided in the pulse ring rotation part 12 at a predetermined interval, where the pulse ring rotation part 12 of the first pulse ring 10 may be formed in an ellipsoidal shape.

In particular, as illustrated in FIGS. 1(a) and 1(b), since a shape of the first pulse ring rotation part 10 is the ellipsoidal shape, not a complete circle shape, an output waveform by the first pulse ring 10 is output with a voltage pulse signal A and a voltage pulse amplitude change signal B, as illustrated in FIG. 2. That is, since a relative distance from the vehicle speed sensor 20 varies to a maximum distance (Max Air Gap) and a minimum distance (Min Air Gap) according to the rotation of the first pulse ring rotation part 10, an output waveform varies according to the relative distance.

The output unit 60 selectively outputs the voltage pulse signal A and the voltage pulse amplitude change signal B, and may include a low pass filter 62 so as to selectively output the voltage pulse signal A and the voltage pulse amplitude change signal B. The output unit 60 may also include a high pass filter according to the voltage pulse amplitude change signal B.

The first vehicle speed detection unit S1 detects a vehicle speed based on the voltage pulse signal A of the output unit 60, and the second vehicle speed detection unit S2 detects a vehicle speed based on the voltage pulse amplitude change signal B of the output unit 60.

For example, when a current vehicle speed is a relatively low speed, the first vehicle speed detection unit S1 detects the vehicle speed based on the voltage pulse signal A, and when the current vehicle speed is a relatively high speed, the second vehicle speed detection unit S2 detects the vehicle speed based on the voltage pulse amplitude change signal B.

In comparison with FIG. 9 (RELATED ART), the number of pitch units in FIG. 1 is the same (i.e., 12 pitch units) as that of FIG. 9. However, since the general vehicle speed sensor needs to calculate a vehicle speed by using the relatively large number of output waveforms at a high speed in the related art depicted in FIG. 9, a processing rate of a processing processor needs to be relatively high in order to accurately calculate the vehicle speed.

However, in a case where the shape of the first pulse ring rotation part 10 illustrated in FIG. 1 is an ellipsoidal shape, not a complete circle, it is possible to calculate the speed by using the voltage pulse amplitude change signal B at a high speed, thereby achieving accurate vehicle speed calculation even at a high speed.

Figure 4:
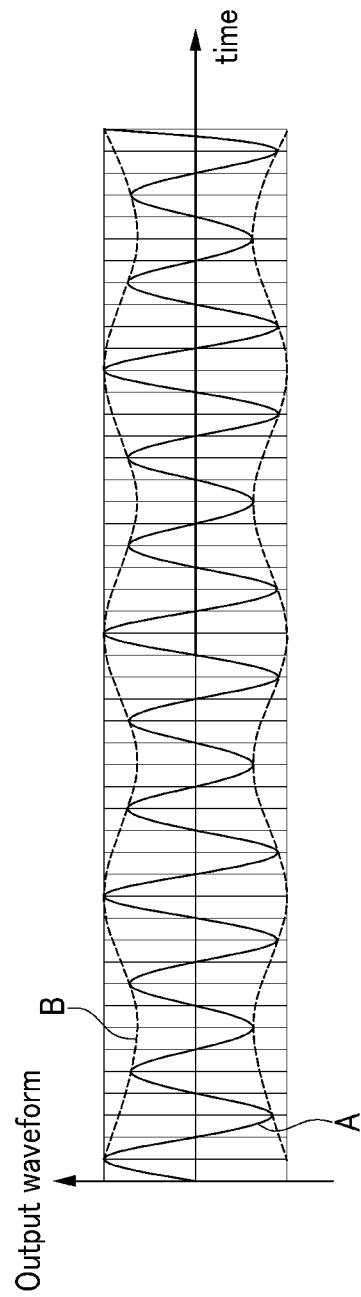
FIG. 4 is a graph illustrating an output waveform by the second pulse ring applied to the vehicle speed detecting system of FIG. 3.

FIG. 3 is a schematic diagram illustrating a second pulse ring applied to the vehicle speed detecting system according to the exemplary embodiment of the present invention, and FIG. 4 is a graph illustrating an output waveform by the second pulse ring applied to the vehicle speed detecting system according to the exemplary embodiment of the present invention.

Referring to FIG. 3, the second pulse ring 30 applied to the vehicle speed detecting system according to the exemplary embodiment of the present invention includes a pulse ring rotation part 32 formed in a polygonal shape with rounded corners, and a plurality of pitch unit 34 provided in the pulse ring rotation part 32 at a predetermined interval. The pulse ring rotation unit 32 may be formed in a square shape with rounded corners as illustrated in FIGS. 3(*a*) and 3(*b*).

Similar to the first pulse ring rotation unit 10 illustrated in FIG. 1, in the second pulse ring 30 applied to the vehicle speed detecting system according to the exemplary embodiment of the present invention, an output waveform by the second pulse ring 30 is output with a voltage pulse signal A and a voltage pulse amplitude change signal B. That is, since a relative distance from the vehicle speed sensor 20 varies to a maximum distance (Max Air Gap) and a minimum distance (MM Air Gap), as illustrated in FIGS. 3(*a*) and 3(*b*) according to the rotation of the second pulse ring rotation part 30, an output waveform varies according to the relative distance.

When a current vehicle speed is a relatively low speed, the first vehicle speed detection unit S1 detects the vehicle speed based on the voltage pulse signal A, and when the current vehicle speed is a relatively high speed, the second vehicle speed detection unit S2 detects the vehicle speed based on the voltage pulse amplitude change signal B of four times. Accordingly, similar to the first pulse ring rotation part 10 illustrated in FIG. 1, it is possible to accurately calculate a vehicle speed at a low speed and a high speed.

Figure 5:
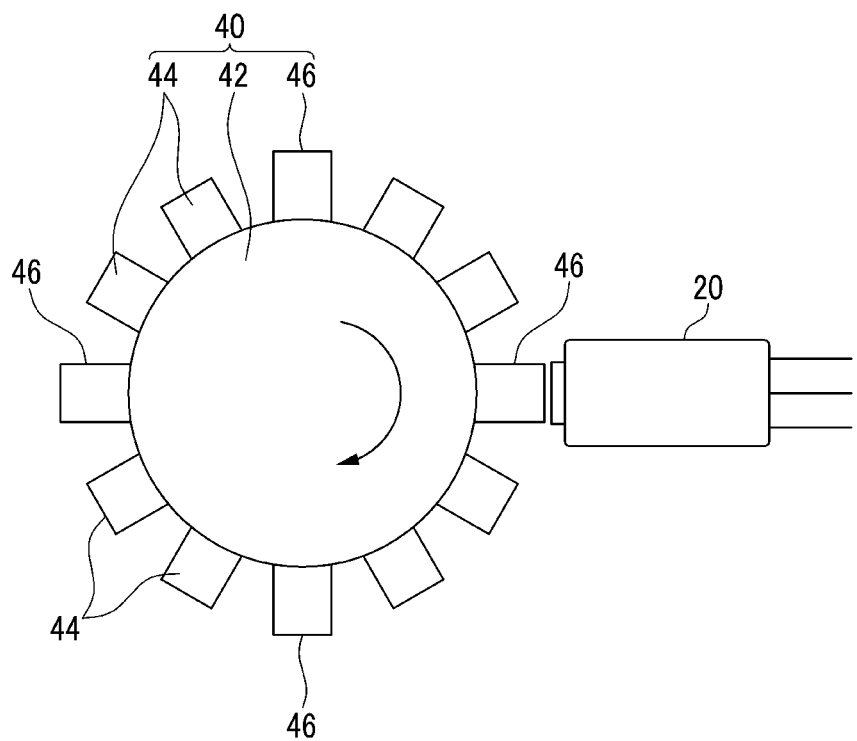
FIG. 5 is a schematic diagram illustrating a third pulse ring applied to the vehicle speed detecting system according to the exemplary embodiment of the present invention.

FIG. 5 is a schematic diagram illustrating a third pulse ring applied to the vehicle speed detecting system according to the exemplary embodiment of the present invention.

Referring to FIG. 5, the third pulse ring 40 applied to the vehicle speed detecting system according to the exemplary embodiment of the present invention includes a pulse ring rotation part 42 shaped like a complete circle, and a plurality of pitch units 44 and 46, and an installation height of at least a part of pitch units 46 among the plurality of pitch units 44 and 46 for the pulse ring rotation unit 42 may be different from an installation height of other pitch units 44 for the pulse ring rotation part 42. That is, the part of pitch units 46 among the 12 pulse units illustrated in FIG. 5 may be installed to be relatively higher than other pitch units 44.

Accordingly, the relative distances between the plurality of pitch units 44 and 46 and the vehicle speed sensor 20 are different in response to the difference of the relative heights, and thus the voltage pulse amplitude is changed. Accordingly, an output waveform by the third pulse ring 40 applied to the vehicle speed detecting system according to the exemplary embodiment of the present invention may be represented with a voltage pulse signal and a voltage pulse amplitude change signal, and thus it is possible to precisely calculate the speed at a low speed and a high speed by detecting the waveforms of the voltage pulse signal and the voltage pulse amplitude change signal.

Figure 6:
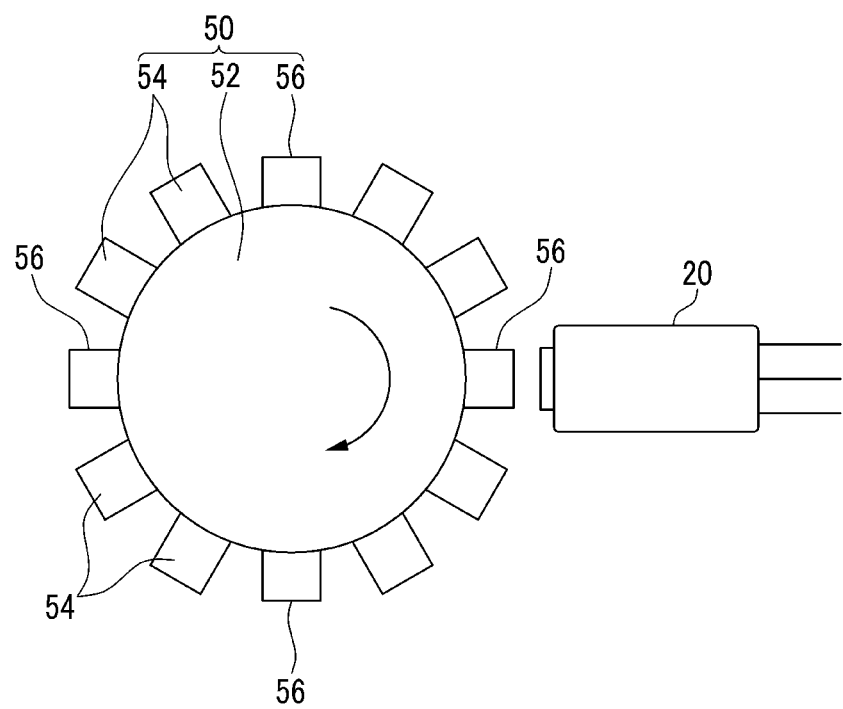
FIG. 6 is a schematic diagram illustrating a fourth pulse ring applied to the vehicle speed detecting system according to the exemplary embodiment of the present invention.

FIG. 6 is a schematic diagram illustrating a fourth pulse ring applied to the vehicle speed detecting system according to the exemplary embodiment of the present invention.

Referring to FIG. 6, the fourth pulse ring 50 applied to the vehicle speed detecting system according to the exemplary embodiment of the present invention includes a pulse ring rotation part 52 which is shaped like a complete circle, and a plurality of pitch units 54 and 46, and an installation height of at least a part of pitch units 56 among the plurality of pitch units 54 and 56 for the pulse ring rotation part 52 may be relatively lower than an installation height of other pitch units 54 for the pulse ring rotation part 52. That is, the part of the pitch units 56 among the 12 pulse units illustrated in FIG. 6 is installed to be relatively higher than other pitch units 54, so that an output waveform by the fourth pulse ring 50 applied to the vehicle speed detecting system according to the exemplary embodiment of the present invention may be represented with a voltage pulse signal and a voltage pulse amplitude change signal, and thus it is possible to precisely calculate the speed at a low speed and a high speed by detecting the waveforms of the voltage pulse signal and the voltage pulse amplitude change signal.

Figure 10:
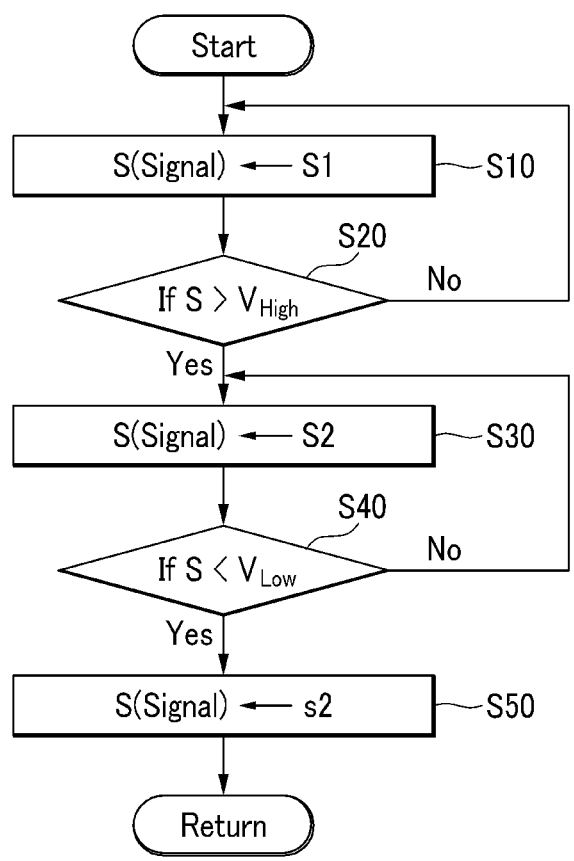
FIG. 10 is a flowchart illustrating a vehicle speed detecting method according to an exemplary embodiment of the present invention.

FIG. 10 is a flowchart illustrating a vehicle speed detecting method according to an exemplary embodiment of the present invention.

Referring to FIGS. 1 to 7, and FIG. 10, the first vehicle speed detection unit S1 calculates a vehicle speed based on the voltage pulse signal A of the output unit 60 to output the calculated vehicle speed as a vehicle speed S (S10)

It is determined whether the signal of the first vehicle speed detection unit S1 is larger than a predetermined first vehicle speed Vhigh (S20), and when the signal of the first vehicle speed detection unit S1 is not larger than the predetermined first vehicle speed Vhigh, the signal of the first vehicle speed detection unit S1 is output as the vehicle speed S.

When the signal S of the first vehicle speed detection unit S1 is larger than the predetermined first vehicle speed Vhigh, the second vehicle speed detection unit S2 calculates a vehicle speed based on the voltage pulse amplitude change signal B of the output unit 60 to output the calculated vehicle speed as the vehicle speed S (S30).

The first vehicle speed Vhigh is a predetermined speed determining whether the current speed of the vehicle is a relatively high speed.

Then, it is determined whether the current vehicle speed S is smaller than a predetermined second vehicle speed Vlow (S40), and when the signal of the second vehicle speed detection unit S2 is not smaller than the second vehicle speed Vlow, the signal of the second vehicle speed detection unit S2 is output as the vehicle speed S.

Then, when the current vehicle speed is smaller than the predetermined second vehicle speed Vlow, the signal of the first vehicle speed detection unit S1 is output as the vehicle speed S.

Predetermined hysteresis is set in order to prevent chattering in a boundary region between the predetermined first vehicle speed Vhigh and the predetermined second vehicle speed Vlow. That is, the predetermined first vehicle speed Vhigh may be larger than the predetermined second vehicle speed Vlow, and a difference therebetween may be set to be approximately 10 to 20 km/h.

As described above, according to the vehicle speed detection system and the vehicle speed detection method using the same according to the exemplary embodiment of the present invention, it is possible to accurately detect a speed of a vehicle at a low speed and a high speed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for detecting a vehicle speed, comprising:
   a pulse ring including a pulse ring rotation part rotating according to travel of a vehicle, and a plurality of pitch units provided in the pulse ring rotation part, the plurality of pitch units being provided at a predetermined interval from each other;
   a vehicle speed sensor provided adjacent to the pulse ring and configured to output a respective voltage signal generated according to a respective adjacent distance between the vehicle speed sensor and each respective pitch unit of the plurality of pitch units;
   an output unit configured to output a waveform of a voltage pulse signal and a waveform of a voltage pulse amplitude change signal of the vehicle speed sensor;
   a first vehicle speed detection unit configured to calculate the vehicle speed based on the waveform of the voltage pulse signal of the output unit; and
   a second vehicle speed detection unit configured to calculate the vehicle speed based on the waveform of the voltage pulse amplitude change signal of the output unit,
   wherein an adjacent distance between at least one of the plurality of pitch units and the vehicle speed sensor is different from an adjacent distance between another of the plurality of pitch units and the vehicle speed sensor.

2. The system of claim 1, wherein:
   the pulse ring rotation part is not shaped like a complete circle.

3. The system of claim 1, wherein:
   the pulse ring rotation part is formed in an ellipsoidal shape.

4. The system of claim 1, wherein:
   the pulse ring rotation part is formed in a polygonal shape with rounded corners.

5. The system of claim 1, wherein:
   the pulse ring rotation part is formed in a square shape with rounded corners.

6. The system of claim 1, wherein:
   the pulse ring rotation part is formed in a shape of a complete circle, and an installation height of the at least one of the plurality of pitch units of the pulse ring rotation part is different from an installation height of the another of the plurality of pitch units of the pulse ring rotation part.

7. The system of claim 1, wherein:
   the output unit includes a low pass filter.

8. The system of claim 1, wherein:
   the output unit includes a high pass filter.

* * * * *